US010557966B2

(12) United States Patent
Capoglu et al.

(10) Patent No.: US 10,557,966 B2
(45) Date of Patent: Feb. 11, 2020

(54) IMPROVING DYNAMIC RANGE IN FIBER OPTIC MAGNETIC FIELD SENSORS

(71) Applicant: Halliburton Energy Services, Inc., Houston, TX (US)

(72) Inventors: Ilker R. Capoglu, Houston, TX (US); Burkay Donderici, Houston, TX (US); Tasneem A. Mandviwala, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 97 days.

(21) Appl. No.: 15/740,493

(22) PCT Filed: Jul. 22, 2015

(86) PCT No.: PCT/US2015/041623
§ 371 (c)(1),
(2) Date: Dec. 28, 2017

(87) PCT Pub. No.: WO2017/014778
PCT Pub. Date: Jan. 26, 2017

(65) Prior Publication Data
US 2018/0188413 A1 Jul. 5, 2018

(51) Int. Cl.
*G01V 8/24* (2006.01)
*E21B 47/12* (2012.01)
*E21B 49/00* (2006.01)
*G01V 3/28* (2006.01)

(52) U.S. Cl.
CPC .............. *G01V 8/24* (2013.01); *E21B 47/123* (2013.01); *E21B 49/00* (2013.01); *G01V 3/28* (2013.01)

(58) Field of Classification Search
CPC .. G01V 8/24; G01V 3/28; E21B 49/00; E21B 47/122; E21B 47/123
USPC .......................... 324/339, 338, 334, 332, 323
See application file for complete search history.

(56) References Cited

U.S. PATENT DOCUMENTS

| | | | | |
|---|---|---|---|---|
| 3,858,159 A | * | 12/1974 | Worth | H01R 12/675 439/399 |
| 5,406,370 A | | 4/1995 | Huang et al. | |
| 5,681,484 A | * | 10/1997 | Zanzucchi | B01J 19/0093 506/40 |
| 6,392,317 B1 | * | 5/2002 | Hall | E21B 17/003 174/47 |
| 7,037,400 B1 | * | 5/2006 | Shaw | B01J 19/0093 156/250 |
| 7,678,562 B2 | * | 3/2010 | Ling | B82Y 5/00 216/56 |
| 2004/0141420 A1 | | 7/2004 | Hardage et al. | |

(Continued)

FOREIGN PATENT DOCUMENTS

WO 2017014778 A1 1/2017

*Primary Examiner* — Giovanni Astacio-Oquendo
(74) *Attorney, Agent, or Firm* — John W. Wustenberg; Parker Justiss, P.C.

(57) ABSTRACT

A system, in some embodiments, comprises: a fiber optic cable; first and second sensors to control a length of said cable; and first and second receiver coils that control the first and second sensors, respectively, wherein the first and second sensors maintain said length when the first and second receiver coils receive only a direct signal from a transmitter, wherein the first and second sensors modify said length when the first and second receiver coils receive a scattered signal from a formation.

20 Claims, 6 Drawing Sheets

(56) References Cited

U.S. PATENT DOCUMENTS

2006/0178047 A1\* 8/2006 Croan ................ H01R 13/6272
                                                  439/578
2008/0018334 A1   1/2008 Reiderman
2012/0176250 A1   7/2012 Duncan et al.
2014/0097848 A1   4/2014 LeBlanc et al.

\* cited by examiner

IMPROVING DYNAMIC RANGE IN FIBER OPTIC MAGNETIC FIELD SENSORS

CROSS-REFERENCE TO RELATED APPLICATION

This application is the National Stage of, and therefore claims the benefit of, International Application No. PCT/US2015/041623 filed on Jul. 22, 2015, entitled "IMPROVING DYNAMIC RANGE IN FIBER OPTIC MAGNETIC FIELD SENSORS," which was published in English under International Publication Number WO 2017/014778 on Jan. 26, 2017. The above application is commonly assigned with this National Stage application and is incorporated herein by reference in its entirety.

BACKGROUND

Fiber optics are commonly used in magnetic field reservoir monitoring systems to detect and determine properties of inhomogeneities in a target reservoir. The optical signal passing through a fiber optic receiver in the absence of any monitored inhomogeneity in the reservoir—such as water flood, steam, gas, and carbon dioxide—is altered in the presence of any such inhomogeneity. The change in the optical signal produced by the presence of the inhomogeneity is then used to infer the properties of the monitored inhomogeneity.

In the absence of any inhomogeneity, fiber optic receivers receive signals directly from a signal source, such as a transmitter. These direct signals are typically strong because they have experienced minimal formation penetration. Once an inhomogeneity—such as a water flood—is introduced to the environment, at least some of the signals received by the fiber optic receivers have reflected off of the inhomogeneity. These signals, called scattered signals, may be significantly weaker than the direct signals. As a result, they can be difficult to distinguish from the direct signals and other noise. This disparity in signal strengths necessitates a large dynamic range in the electronics associated with the fiber optic system, which is often not practical in downhole environments.

BRIEF DESCRIPTION OF THE DRAWINGS

Accordingly, there are disclosed in the drawings and in the following description techniques for improving the dynamic range in fiber optic magnetic field sensors. In the drawings.

Figure 1:
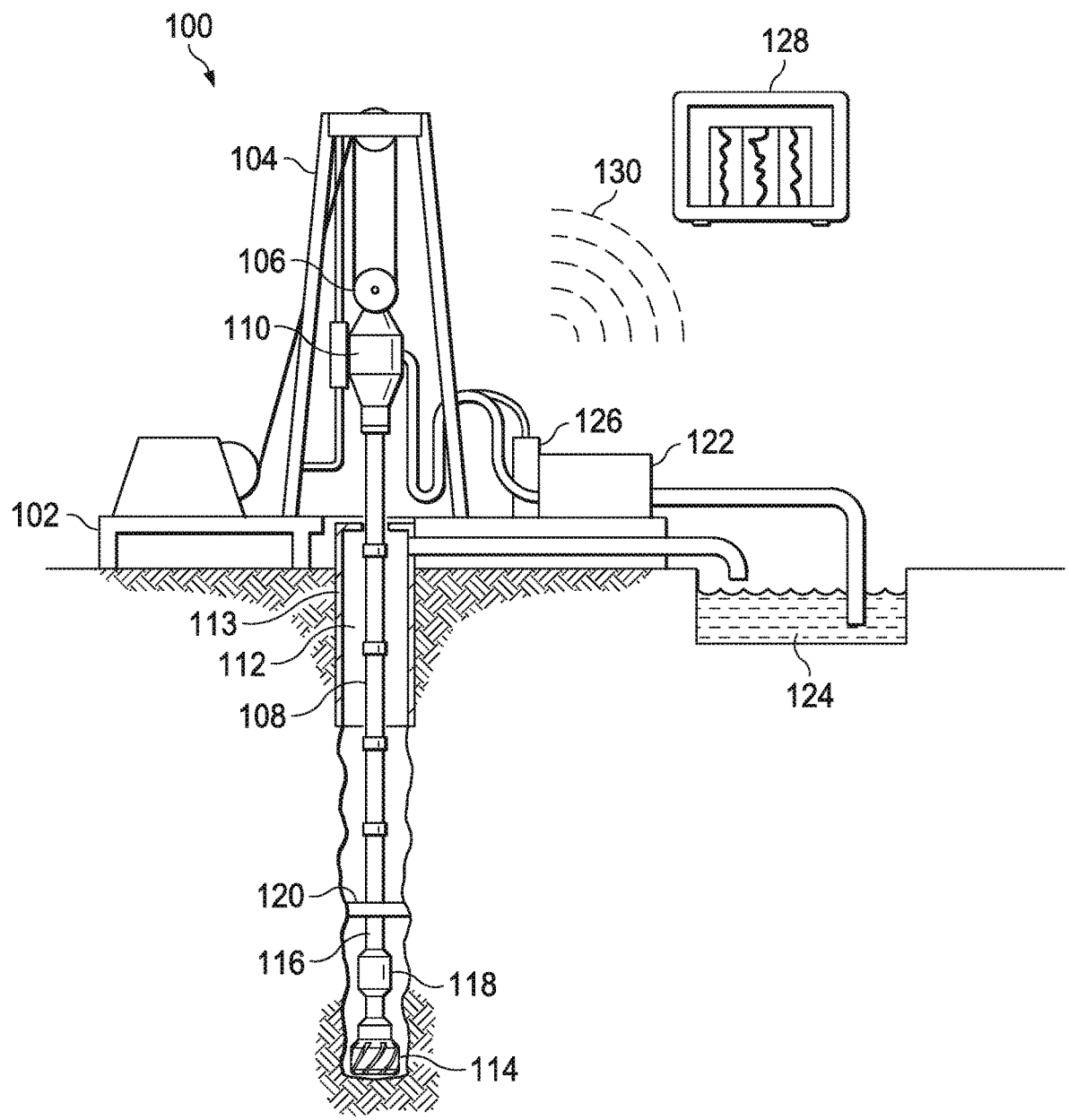
FIG. 1 is a schematic diagram of a drilling environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are various embodiments of a fiber optic reservoir monitoring system in which receiver coils are strategically wound and positioned relative to a transmitter so that any direct signals received from the transmitter are cancelled. Because direct signals are cancelled, scattered signals containing valuable information pertaining to the reservoir dominate the signals received at the receiver coils. Accordingly, because the direct signal—which is substantially stronger than the scattered signal—is cancelled, the scattered signals are easier to interpret and they demand a smaller dynamic range of the downhole equipment used to process those signals.

Figure 2:
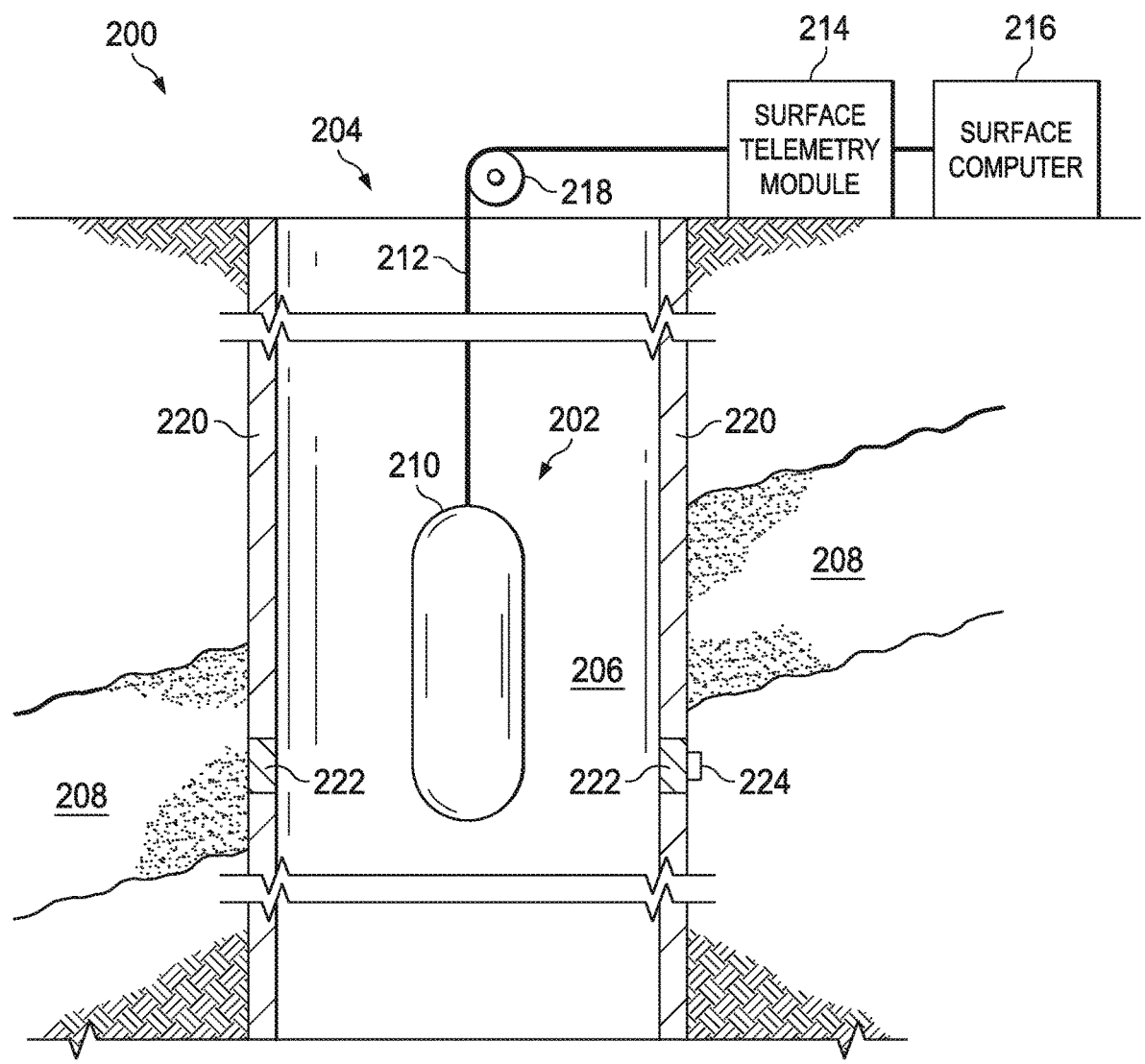
FIG. 2 is a schematic diagram of a wireline environment.
Figure 3:
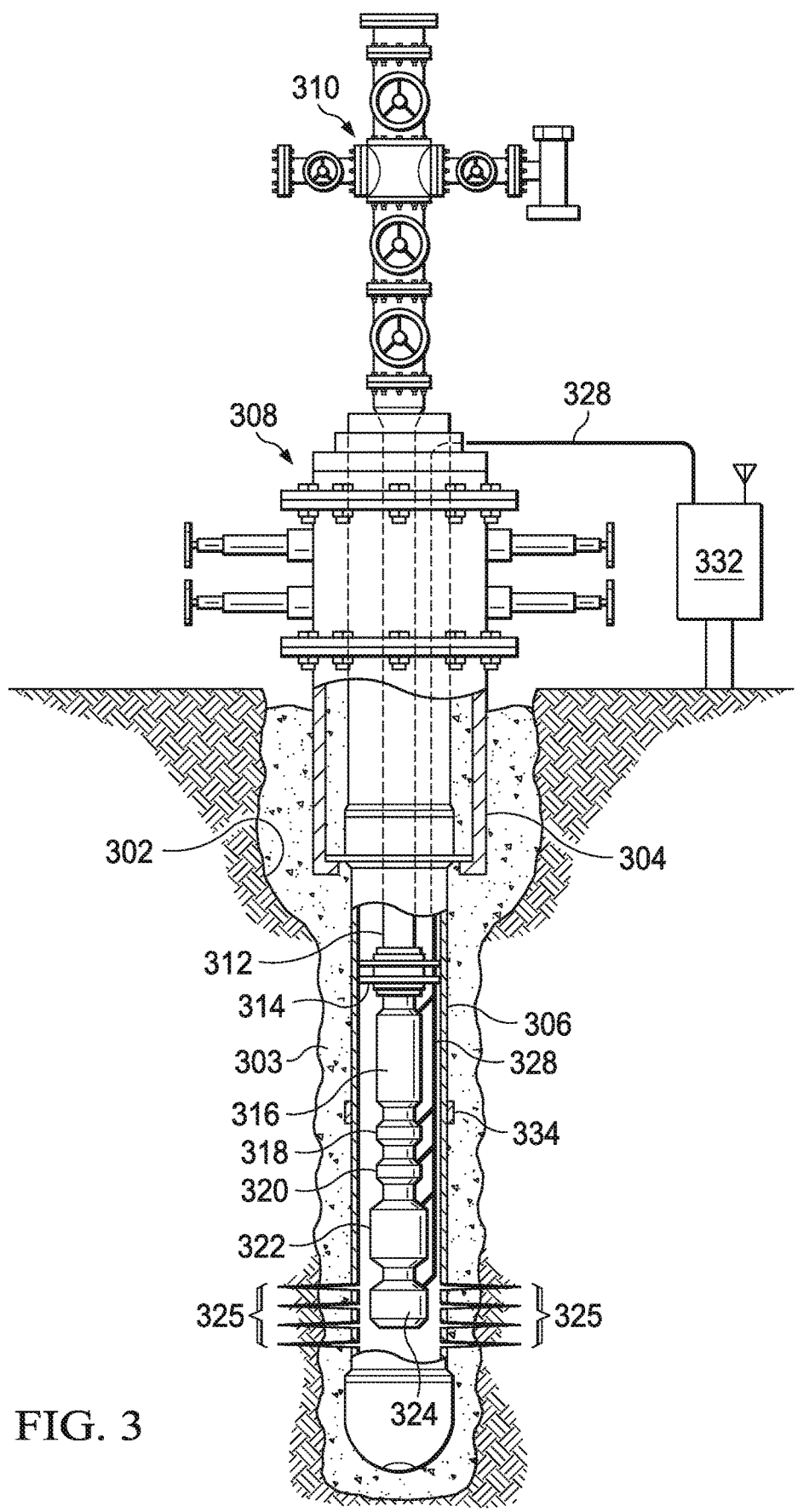
FIG. 3 is a schematic diagram of a production environment.

FIGS. 1-3 represent various environments within which the disclosed fiber optic reservoir monitoring techniques may be implemented. The disclosed monitoring techniques are not limited to implementation in the particular examples shown in FIGS. 1-3, however, and the scope of disclosure encompasses any and all environments in which reservoir monitoring may be desirable.

FIG. 1 is a schematic diagram of an illustrative drilling environment. The drilling environment 100 comprises a drilling platform 102 that supports a derrick 104 having a traveling block 106 for raising and lowering a drill string 108. A top-drive motor 110 supports and turns the drill string 108 as it is lowered into a borehole 112. The drill string's rotation, alone or in combination with the operation of a downhole motor, drives the drill bit 114 to extend the borehole 112. The drill bit 114 is one component of a bottomhole assembly (BHA) 116 that may further include a rotary steering system (RSS) 118 and stabilizer 120 (or some other form of steering assembly) along with drill collars and logging instruments. A pump 122 circulates drilling fluid through a feed pipe to the top drive 110, downhole through the interior of drill string 108, through orifices in the drill bit 114, back to the surface via an annulus around the drill string 108, and into a retention pit 124. The drilling fluid transports formation samples—i.e., drill cuttings—from the borehole 112 into the retention pit 124 and aids in maintaining the integrity of the borehole. Formation samples may be extracted from the drilling fluid at any suitable time and location, such as from the retention pit 124. The formation samples may then be analyzed at a suitable surface-level laboratory or other facility (not specifically shown). While drilling, an upper portion of the borehole 112 may be stabilized with a casing string 113 while a lower portion of the borehole 112 remains open (uncased). Receivers used to implement the monitoring techniques described herein may be mounted on such a casing string 113, as described below.

The drill collars in the BHA 116 are typically thick-walled steel pipe sections that provide weight and rigidity for the drilling process. The thick walls are also convenient sites for installing transmitters, receivers and logging instruments that measure downhole conditions, various drilling parameters, and characteristics of the formations penetrated by the borehole. The BHA 116 typically further includes a navigation tool having instruments for measuring tool orientation (e.g., multi-component magnetometers and accelerometers) and a control sub with a telemetry transmitter and receiver. The control sub coordinates the operation of the various logging instruments, steering mechanisms, and drilling motors in accordance with commands received from the surface, and it provides a stream of telemetry data to the surface as needed to communicate relevant measurements and status information. A corresponding telemetry receiver and transmitter is located on or near the drilling platform 102 to complete the telemetry link. One type of telemetry link is based on modulating the flow of drilling fluid to create pressure pulses that propagate along the drill string ("mud-pulse telemetry or MPT"), but other known telemetry techniques are suitable, such as electromagnetic and acoustic telemetry. At least some of the data obtained by the control sub may be stored in memory for later retrieval, e.g., when the BHA 116 physically returns to the surface.

A surface interface 126 serves as a hub for communicating via the telemetry link and for communicating with the various sensors and control mechanisms on the platform 102. A data processing unit (shown in FIG. 1 as a tablet computer 128) communicates with the surface interface 126 via a wired or wireless link 130, collecting and processing measurement data (e.g., fiber optic cable optical signals) to generate logs and other visual representations of the acquired data and the derived models to facilitate analysis by a user. The data processing unit may take many suitable forms, including one or more of: an embedded processor, a desktop computer, a laptop computer, a central processing facility, and a virtual computer in the cloud. In each case, software on a non-transitory information storage medium may configure the processing unit to carry out the desired processing, modeling, and display generation. The data processing unit may also contain storage to store, e.g., data received from tools in the BHA 116 via electromagnetic or acoustic telemetry or any other suitable communication technique. The scope of disclosure is not limited to these particular examples of data processing units.

FIG. 2 is a schematic diagram of an illustrative wireline environment. More specifically, FIG. 2 illustrates a logging system 200 in accordance with at least some embodiments. Logging system 200 comprises a wireline logging tool 202 disposed within a borehole 204 proximate to a formation 208 of interest. The borehole 204 contains a casing string 220 and casing fluid 206, which may comprise one or more of oil, gas, fresh water, saline water, or other substances. Receivers used to implement the monitoring techniques described herein may be mounted on such a casing string 220, as described below. The tool 202 comprises a sonde 210 within which various subsystems of the tool 202 reside. These subsystems are equipped to measure various parameters associated with the formation and wellbore. In the illustrative case of FIG. 2 the sonde 210 is suspended within the borehole 204 by a cable 212. Cable 212, in some embodiments a multi-conductor armored cable, not only provides support for the sonde 210, but also in these embodiments communicatively couples the tool 202 to a surface telemetry module 214 and a surface computer 216. The tool 202 may be raised and lowered within the borehole 204 by way of the cable 212, and the depth of the tool 202 within the borehole 204 may be determined by depth measurement system 218 (illustrated as a depth wheel). The casing string 220 may be composed of multiple segments of casing that are joined using casing collars, such as collar 222. In some embodiments, tools (e.g., electrodes, logging equipment, and communication equipment including fiber optics and transmitters and/or receivers) may be included within, coupled to or adjacent to the casing string 220 and/or the collar 222. For example, FIG. 2 includes a transceiver 224 that functions as a transmitter, receiver or both and communicates with other transmitters or receivers in other parts of the borehole 204, within the sonde 210 or at the surface.

FIG. 3 is a schematic diagram of a producing well with a borehole 302 that has been drilled into the earth. Such boreholes, examples of which are described above with respect to FIGS. 1 and 2, are routinely drilled to ten thousand feet or more in depth and can be steered horizontally for twice that distance. The producing well includes a casing header 304 and casing 306, both secured into place by cement 303. Blowout preventer (BOP) 308 couples to casing header 306 and production wellhead 310, which together seal in the well head and enable fluids to be extracted from the well in a safe and controlled manner.

The use of measurement devices permanently installed in the well facilitates monitoring of the well and/or the surrounding formation. The different transducers send signals to the surface that may be stored, evaluated and used to monitor the well's operations. Such signals may be transmitted using, e.g., a transmitter 334 that couples to or is disposed within the casing 306 or a collar of the casing 306. Such a transmitter may communicate with a receiver in any part of the system shown in FIG. 3, such as a receiver disposed in another part of the casing 306, within a different casing collar, within the well, or at the surface. Receivers used to implement the monitoring techniques described herein may be mounted on such a casing 306 or casing collar, as described below. Near-wellbore measurements are periodically taken at the producing well and combined with measurements from other wells within a reservoir, enabling the overall state of the reservoir to be monitored, simulated and assessed. These measurements may be taken using a number of different downhole and surface instruments, including, but not limited to, temperature and pressure sensor 318 and flow meter 320. Additional devices also coupled in-line along production tubing 312 include downhole choke 316 (used to vary the fluid flow restriction), electric submersible pump (ESP) 322 (which draws in fluid flowing from perforations 325 outside ESP 322 and production tubing 312), ESP motor 324 (driving ESP 322), and packer 314 (isolating the production zone below the packer from the rest of the well). Additional surface measurement devices may be used to measure, for example, the tubing head pressure and the electrical power consumption of ESP motor 324. Although the example of FIG. 3 shows a well that incorporates an ESP, the disclosed systems and methods may also be used with wells that incorporate other systems for assisting with the extraction of fluids (e.g., gas lift systems), or with wells without such assist systems that rely on the pressure already present in the formation and/or induced by the injector wells.

Each of the devices along production tubing 312 couples to cable 328, which is attached to the exterior of production tubing 312 and is run to the surface through blowout preventer 308 where it couples to control panel 332. Cable 328 provides power to the devices to which it couples, and further provides signal paths (electrical, optical, etc.,) that enable control signals to be directed from the surface to the downhole devices, and for telemetry signals to be received at the surface from the downhole devices. The devices may be controlled and monitored locally by field personnel using a user interface built into control panel 332, or they may be controlled and monitored by a computer system (not specifically shown). Communication between control panel 332 and such a computer system may be via a wireless network (e.g., a cellular network), via a cabled network (e.g., a cabled connection to the Internet), or a combination of wireless and cabled networks.

Figure 4:
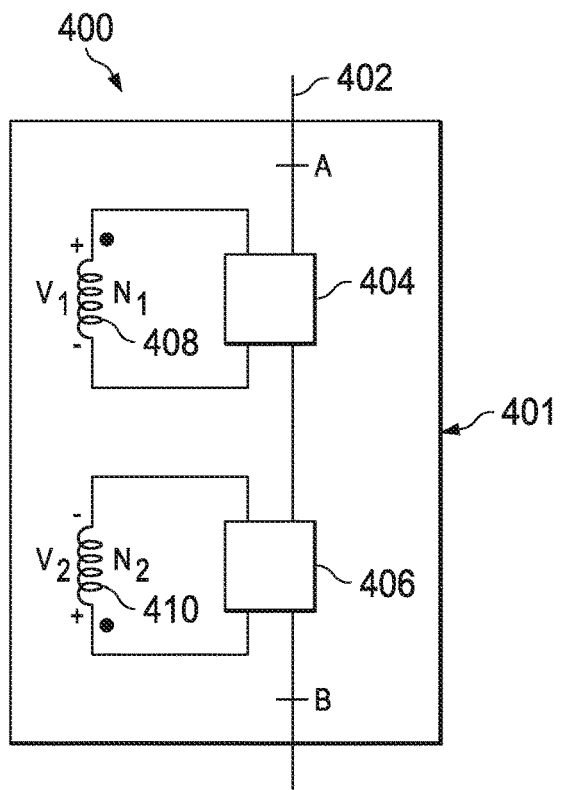
FIG. 4 is a schematic diagram of a first receiver coil and sensor configuration in a fiber optic reservoir monitoring system.

FIG. 4 is a schematic diagram of a portion of an illustrative fiber optic reservoir monitoring system 400 in accordance with embodiments. The system 400 may be positioned in any suitable uphole or downhole location, including, for example, in a wireline sonde, coupled to a tubing or casing, in a cement sheath, in a drill string bottom hole assembly, or on the surface of the earth. Other locations for the system 400 are contemplated and included in the scope of disclosure. For example, in some embodiments, different parts of the system 400 depicted in FIG. 4 are located in different areas.

The system 400 includes a receiver 401. The receiver 401 receives a fiber optic cable 402. In some embodiments, numerous receivers couple to the fiber optic cable 402. Accordingly, in such embodiments, the fiber optic cable 402 may pass through the receiver 401 and be routed to another receiver that is located, for instance, downhole from the receiver 401. The receiver 401 and fiber optic cable 402 are of any suitable shape and size. In at least some embodiments, the receiver 401 is cylindrical. The system 400 also includes a transmitter (not specifically shown). The transmitter is not necessarily located in the same area as the receiver 401, but the transmitter is preferably positioned so that electromagnetic signals emitted by the transmitter can be received by the receiver 401.

The receiver 401 includes the fiber optic cable 402, a fiber optic sensor 404, a fiber optic sensor 406, a receiver coil 408 coupled to the sensor 404, and a receiver coil 410 coupled to the sensor 406. Each of the sensors 404, 406 includes a piezoelectric material, such as lead zirconate titanate (PZT), around which the fiber optic cable 402 is wrapped in a coil configuration (as depicted in greater detail in FIG. 8). The piezoelectric material in the sensors 404, 406 also include input terminals (preferably, two input terminals) that couple to the receiver coils 408, 410, respectively. When the receiver coils 408, 410 apply voltages to the input terminals, the piezoelectric material expands or contracts, depending on the voltage applied. As the piezoelectric material expands, the fiber optic cable 402 wrapped around the piezoelectric material experiences strain and increases in length. Conversely, as the piezoelectric material contracts, the fiber optic cable 402 wrapped around the piezoelectric material decreases in length. If no voltage is applied to the input terminals, the fiber optic cable 402 maintains its current length. Similarly, if one sensor—e.g., sensor 404—contains an expanding piezoelectric material while another sensor—e.g., sensor 406—contains a contracting piezoelectric material, the expansion and contraction counteract each other. In such a case, if the expansion exceeds the contraction, the fiber optic cable 402 experiences a net increase in length; if the contraction exceeds the expansion, the fiber optic cable 402 experiences a net decrease in length; and if the expansion and contraction negate each other, the fiber optic cable 402 experiences no net change in length. The term "net" is used because the fiber optic cable 402 may experiences a lengthening as a result of one of the sensors and a shortening as a result of another one of the sensors, but the overall length is maintained, meaning that the net change in length is zero or substantially zero. By "substantially zero," it is meant that the length of the fiber optic cable experiences an insubstantial modification (e.g., a variation of plus or minus 5% of the original length of the fiber optic cable prior to the expansion/contraction in question).

Referring still to FIG. 4, the receiver coils 408, 410 preferably are wound in opposite directions, as indicated by the dots shown adjacent to the coils. The number of turns in each of the receiver coils 408, 410 may vary. In addition, the positions of the receiver coils 408, 410 along the fiber optic cable 401 (and, therefore, the positions of the sensors 404, 406 along the fiber optic cable 401) may vary.

In operation, a transmitter (not specifically shown) generates electromagnetic (EM) waves that propagate through the reservoir being monitored by the system 400. At least some of the EM signals travel directly from the transmitter to the receiver 401. As explained above, such signals are called "direct signals." Other EM signals arrive at the receiver 401 after having reflected off of an inhomogeneity (e.g., a water flood) in the reservoir. Such signals are called "scattered signals." Because direct signals typically experience less formation penetration than scattered signals and thus take a more direct route from transmitter to receiver, the direct signals are stronger than the scattered signals. This phenomenon results in the direct signals overpowering, or "drowning out," the scattered signals and making the scattered signals difficult to detect and interpret. In addition, the downhole equipment used to process the direct and scattered signals detected by the receiver 401 must have a relatively high dynamic range to process all of the collected signal data—i.e., both direct and scattered signals.

The receiver 401, however, is designed to overcome these and potentially other challenges associated with receiving direct and scattered signals. Specifically, in some embodiments, each of the receiver coils 408, 410 is positioned relative to the transmitter so that the fiber optic cable 401 experiences no net change in length upon receipt of a direct signal. This occurs because the receiver coils 408, 410 are wound in opposing directions, thus applying voltages with opposing polarities to the sensors 404, 406. Thus, while one of the sensors 404, 406 causes the fiber optic cable 401 to increase in length, the other sensor 404, 406 causes the fiber optic cable 401 to experience a commensurate decrease in length, resulting in no net change in the fiber optic cable length. The positions of the receiver coils 408, 410 are calibrated in the absence of any targeted inhomogeneity—that is, in the absence of scattered signals resulting from a targeted inhomogeneity. Thus, for example, when no scattered signals are present and only direct signals are present, the positions of the receiver coils 408, 410 are adjusted until the voltages $V_1$, $V_2$ applied to the sensors 404, 406 result in no net change in fiber optic cable length. In some embodiments, the positions of the receiver coils 408, 410 are calibrated while the receiver 401 is positioned downhole. In some embodiments, the positions of the receiver coils 408, 410 are calibrated at the surface using a model of the downhole environment. Other calibration techniques for the positions of the receiver coils 408, 410 are contemplated and fall within the scope of the disclosure.

Other techniques for cancelling the direct signal are contemplated, and these techniques may be combined with each other and/or with the position calibration technique described above. In some embodiments, for instance, the number of turns in one or both of the receiver coils 408, 410 may be adjusted to cancel the direct signal. For example, assuming for a moment that the positions of the receiver coils 408, 410 are fixed and that the length of the fiber optic cable 402 is being decreased because the signal received at the receiver coil 410 results in a greater absolute voltage value $V_2$ than the absolute voltage value $V_1$, the number of turns in the receiver coil 408 may be increased to compensate for the difference between the absolute values of $V_1$ and $V_2$ until the length of the fiber optic cable 402 is static. As with the receiver coil position calibration, this receiver coil turn calibration may be performed downhole, with a suitable model of the downhole environment at the surface, or using any other suitable calibration environment.

Still other techniques for cancelling the direct signal are contemplated. For example, the number of turns of the fiber optic cable 402 around one or both of the piezoelectric materials in the sensors 404, 406 may be adjusted until the effect of the direct signal on the length of the fiber optic cable 402 is negated. The basic principle underlying this adjustment of the number of turns of the fiber optic cable 402 is similar to that underlying the adjustment of the number of turns of the receiver coils 408, 410. Accordingly, assuming a fixed position of the receiver coils 408, 410 and number of turns of the receiver coils 408, 410, the number of turns of the fiber optic cable 402 around the piezoelectric material in either of the sensors 404, 406 may be adjusted to adjust the impact of a corresponding receiver coil signal on the expansion or contraction of the piezoelectric material and, by extension, on the length of the fiber optic cable 402.

The foregoing calibration techniques may be performed alone or in any combination. In addition, different combinations of calibration techniques may be applied to different receivers coupled to the same fiber optic cable. All such combinations and variations are included within the scope of this disclosure.

Once a receiver has been adjusted to cancel the effects of direct signals on the length of the fiber optic cable, the receiver may be used to detect scattered signals from reservoir inhomogeneities of interest, such as water floods. The receiver cancels the direct signal but not the scattered signal because the direct and scattered signals vary differently with the distance between the transmitter and receiver coils. Thus, while a particular combination of receiver coil position, receiver coil turns, and/or fiber optic cable turns may negate the direct signal, the scattered signal is still received. Because only the scattered signal is received, or at least because the scattered signal significantly dominates the direct signal (in situations where the direct signal is diminished but not fully cancelled), the scattered signal is more easily interpreted and the dynamic range required of downhole equipment to process the collected signal data is decreased (i.e., improved).

Surface equipment, such as the surface interface 126 and computer 128 (FIG. 1), the surface computer 216 (FIG. 2), and/or the surface panel 332 or a computer coupled to the surface panel 332 (FIG. 3) may couple to and interrogate the fiber optic cable 402. These and other, similar devices may be used to monitor the degree of strain in the fiber optic cable 402. The strain (and, hence, the phase change in the optical signals passing through the fiber optic cable 402) are remotely interrogated using well-known interrogation techniques such as intrinsic Fabry-Perot. In this case, the sensors 404, 406 are positioned between two partially reflective mirrors (known as Fiber Bragg gratings) positioned at points A and B as depicted in FIG. 4. Similarly, other interrogation techniques involving Michelson or Mach Zehnder interferometers may be applied as is well-known in the art. In addition, optical technologies other than those shown in FIGS. 4-7 may be used. For instance, in some embodiments, each of the sensors 404, 406 may be PZT bonded to a fiber laser strain sensor so that the strain induced in the PZT (and, hence, the strain transferred to the fiber laser strain sensor) is proportional to the voltage applied to it, which, in turn, is proportional to the magnetic field of interest. The strain and the resulting phase change in the optical signal may be remotely interrogated and multiplexed using any suitable interrogation and multiplexing technique. Similarly, in some embodiments, each of the sensors 404, 406 may be $LiNbO_3$ phase modulators. When the voltages from the receiver coils are applied, the refractive indices in the $LiNbO_3$ phase modulators vary in proportion to the applied voltages, which, in turn, are proportional to the magnetic field of interest. Suitable multiplexing and interrogation techniques, such as the intrinsic Fabry-Perot technique, may be used at the surface to process signals from such $LiNbO_3$ phase modulators.

Figure 5:
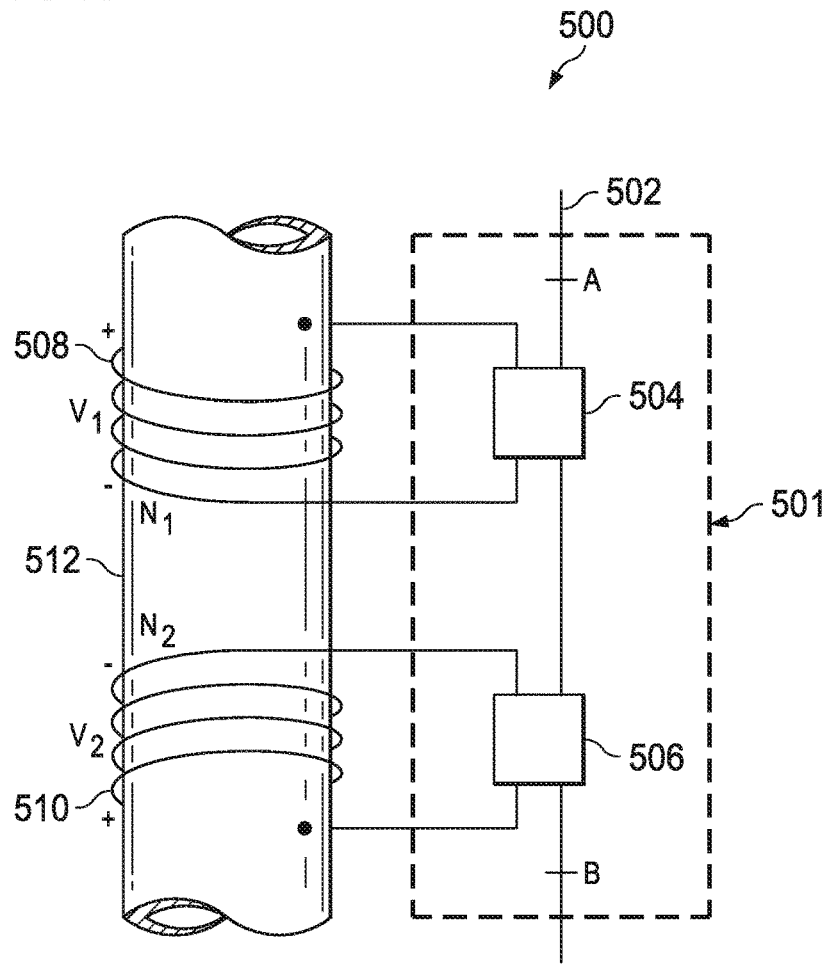
FIG. 5 is a schematic diagram of a second receiver coil and sensor configuration in a fiber optic reservoir monitoring system.

FIG. 5 is a schematic diagram of an alternative configuration for the embodiments depicted in FIG. 4. Specifically, FIG. 5 shows a system 500 that has a receiver 501 comprising piezoelectric sensors 504, 506, which couple to receiver coils 508, 510, respectively. A fiber optic cable 502 passes through the receiver 501 and couples to the sensors 504, 506. The receiver coils 508, 510 are wound in opposing directions so that the direct signals that they receive may be cancelled. The configuration of the system 500 depicted in FIG. 5 is similar to that shown in FIG. 4, except that the receiver coils 508, 510 are wound around a well casing 512. In preferred embodiments, an insulative material (e.g., epoxy resin) is applied to the casing 512 to preclude direct electrical contact between the casing and the receiver coils. The operation of the system 500, however, is similar to the operation of the system 400 shown in FIG. 4. As with the system 400, in system 500, the positions and number of turns of the receiver coils 508, 510 may be adjusted to cancel the effect of the direct signal on the length of the fiber optic cable 502. The number of turns of the fiber optic cable 502 around the piezoelectric material in the sensors 504, 506 may be adjusted for the same reason.

Figure 6:
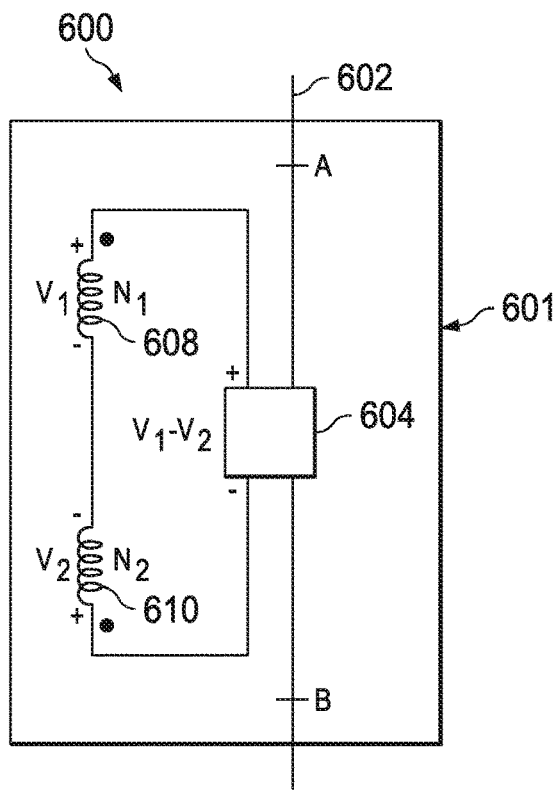
FIG. 6 is a schematic diagram of a third receiver coil and sensor configuration in a fiber optic reservoir monitoring system.

FIG. 6 is a schematic diagram of a portion of an illustrative fiber optic reservoir monitoring system 600 in accordance with embodiments. The system 600 includes a receiver 601, which, in turn, comprises a sensor 604 and receiver coils 608, 610 coupled to the sensor 604. The receiver coils 608, 610 couple in series with each other and have opposing windings so that the voltage potentials $V_1$, $V_2$ across the coils have opposing polarities. A fiber optic cable 602 passes through the receiver 601 and couples to the sensor 604—more specifically, the cable 602 is coiled around a piezoelectric material within the sensor 604. As with the systems 400 and 500, in system 600, the positions and number of turns of the receiver coils 608, 610 may be adjusted to cancel the effect of the direct signal on the length of the fiber optic cable 602.

Figure 7:
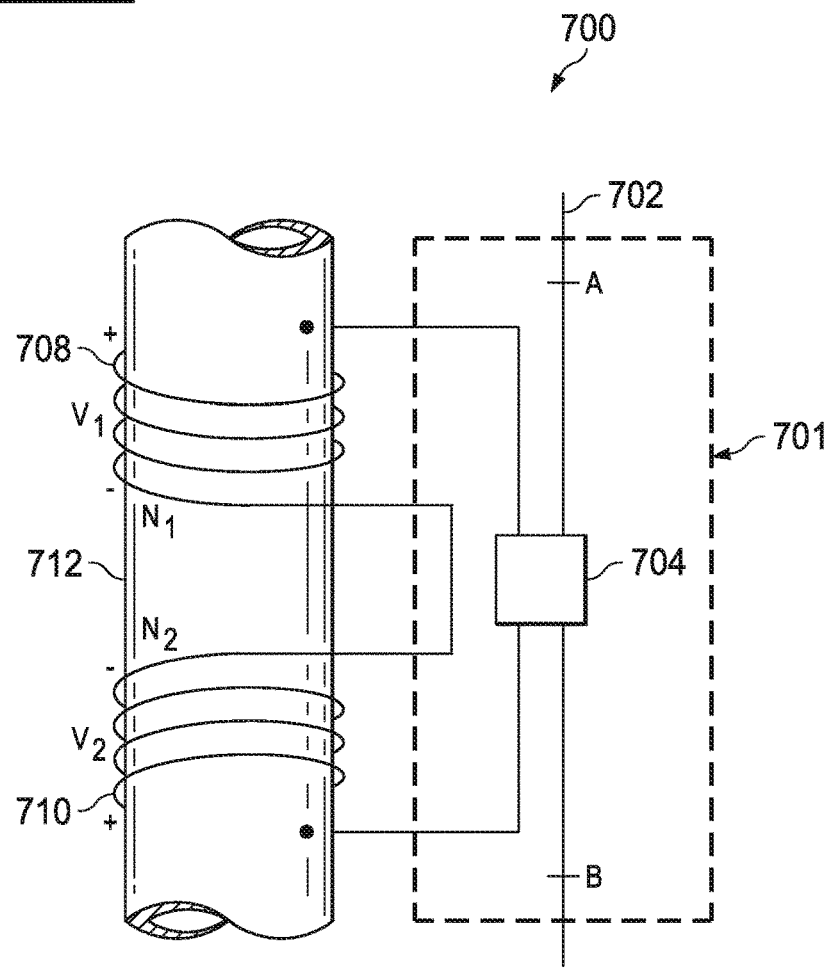
FIG. 7 is a schematic diagram of a fourth receiver coil and sensor configuration in a fiber optic reservoir monitoring system.

FIG. 7 is a schematic diagram of an alternative configuration for the embodiments depicted in FIG. 6. Specifically, FIG. 7 depicts a system 700 comprising a receiver 701 that includes a piezoelectric sensor 704. The sensor 704 couples to receiver coils 708, 710, which couple in series with each other and have opposing windings. A fiber optic cable 702 passes through the receiver 701 and couples to the sensor 704. The system 700 is similar to the system 600, except that in the system 700, the receiver coils 708, 710 are wound around a well casing 712. In at least some embodiments, an insulative material (e.g., epoxy resin) precludes direct electrical contact between the receiver coils 708, 710 and the casing 712. As with the systems 400, 500 and 600, in system 700, the positions and number of turns of the receiver coils 708, 710 may be adjusted to cancel the effect of the direct signal on the length of the fiber optic cable 702.

The principles of operation in systems 400, 500, 600 and 700 are similar. Cancellation of the impact of direct signals on the length of the fiber optic cable is achieved by adjusting the positions of one or more of the receiver coils with respect to the transmitter that is transmitting the direct signals; by adjusting the number of turns in one or more of the receiver coils; by adjusting the number of turns in the fiber optic cable coil that wraps around piezoelectric material in one or more sensors; or some combination thereof, until the impact of the direct signal on the length of the fiber optic cable has been negated or substantially negated (e.g., the change in fiber optic cable length is plus or minus 5% of the original cable length prior to exposure to the direct signal). The manner in which the systems 400 and 500 accomplish this cancellation, however, is not identical to the manner in which the systems 600 and 700 accomplish the cancellation. Specifically, referring to illustrative FIGS. 4 and 6, the system 400 includes receiver coils that couple to different sensors, while the system 600 includes receiver coils that couple to a common sensor. Thus, in the system 400, the voltages $V_1$ and $V_2$ impact the length of the fiber optic cable 402 separately. As a result, the direct signal cancellation described above occurs in the fiber optic cable itself, since the sensors 404, 406 act on the fiber optic cable 402 independently of each other. Conversely, in the system 600, the voltages $V_1$ and $V_2$ are combined and the difference between the two voltages is applied to the sensor 604. As a result, the direct signal cancellation described above occurs by voltage combination and not in the fiber optic cable itself. Stated another way, in system 400 the direct signal cancellation is accomplished using optical signals, while in system 600 the direct signal cancellation is accomplished using voltage signals. The systems 400, 500, 600 and/or 700 may be designed to be inductive and/or galvanic systems.

The packages of the receivers 401, 501, 601 and/or 701, in some embodiments, are hollowed cylinders enclosed at both ends. The cylinders may be filled with a fluid and sealed. The ends may be penetrated by the fiber optic cables. The ends may include appropriate connectors to mechanically couple the cylinders to tubing encapsulated cables (TEC). The receiver coils may be housed within the cylinders, such as in the embodiments depicted in FIGS. 4 and 6. In some embodiments, the cylinders are filled with a chemically inert, non-magnetic, electrically insulating fluid. In some embodiments, the cylinders are filled with a chemically inert, non-magnetic, electrically insulating, non-compressible fluid. In some embodiments, the cylinders are filled with a chemically inert magnetic fluid that enhances magnetic permeability inside the cylinder, thus enhancing the magnetic flux passing through the receiver coils and the resulting induced voltages.

Figure 8:
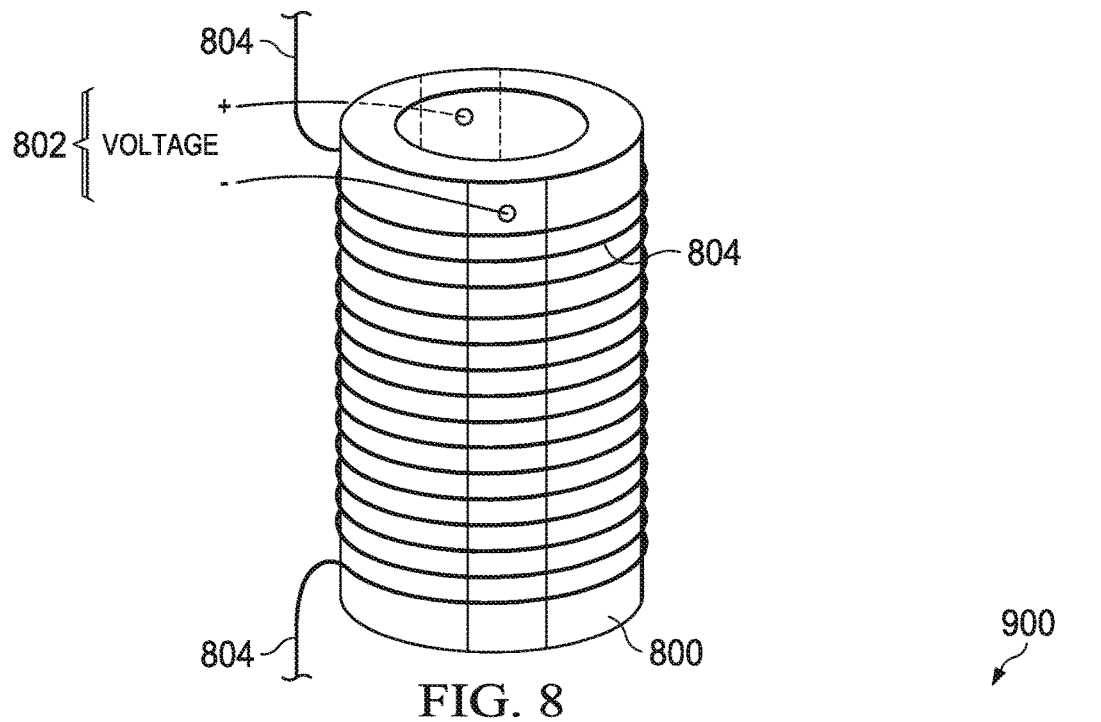
FIG. 8 is a perspective view of a fiber optic sensor.

FIG. 8 is a perspective view of a piezoelectric device 800, such as that housed within sensors 404, 406, 504, 506, 604, and 704. The device 800 may comprise, for instance, lead zirconate titanate (PZT), although other materials that impart the functionality described above also may be used. Positive and negative voltage terminals 802 are applied to the device 800, causing the device 800 to expand or contract in accordance with the polarity and magnitude of the voltage applied. Such expansion and contraction of the device 800 causes changes in the strain in the fiber optic cable 804, thus altering the length of the fiber optic cable 804. Changes in the length of the cable 804 modify the phase of the optical signal passing through the cable 804. These changes may be measured and interpreted at the surface using any of the techniques described above or any other suitable technique.

Figure 9:
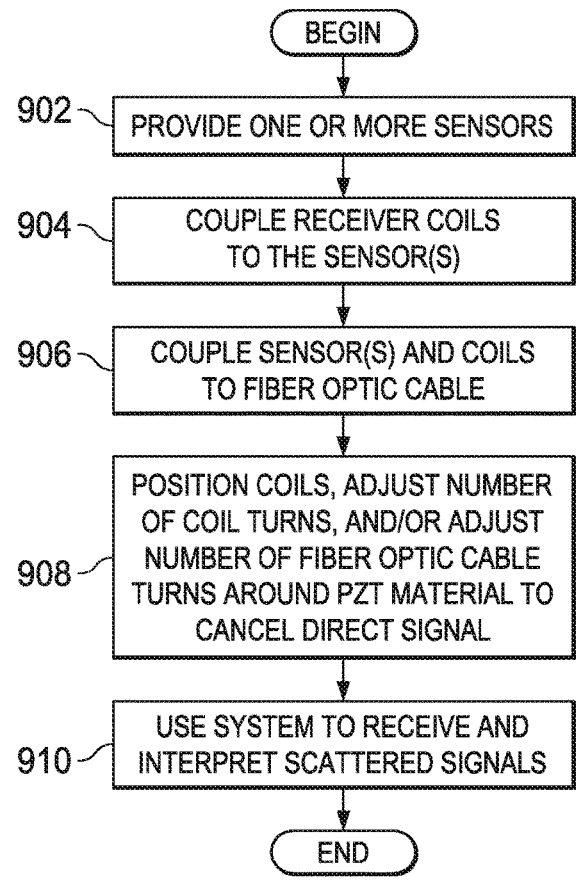
FIG. 9 is a flow diagram of a method to make and use a fiber optic reservoir monitoring system in accordance with embodiments.

FIG. 9 is a flow diagram of a method 900 to make and use a fiber optic reservoir monitoring system in accordance with embodiments. The method 900 begins by providing one or more sensors (step 902) and coupling one or more receiver coils to the one or more sensors (step 904). The precise configuration used may be selected from any of the embodiments described herein, although the scope of disclosure is not limited as such. The method 900 next comprises coupling the one or more sensors and coils to a fiber optic cable (step 906). The method 900 also comprises positioning the receiver coils, adjusting the number of coil turns, and/or adjusting the number of fiber optic cable turns around the piezoelectric material to cancel the direct signal (step 908). As explained above, this step may be performed either downhole in the presence of direct signals or at the surface using a model of the targeted downhole environment. Other configuration environments are contemplated. After the impact of the direct signal on the fiber optic cable has been cancelled during step 908, the system may be used to receive and interpret scattered signals as necessary (step 910). The method 900 may be modified as necessary, including by adding, deleting, rearranging or otherwise modifying steps.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

At least some embodiments are directed to a system, comprising: a fiber optic cable; first and second sensors to control a length of said cable; and first and second receiver coils that control the first and second sensors, respectively, wherein the first and second sensors maintain said length when the first and second receiver coils receive only a direct signal from a transmitter, wherein the first and second sensors modify said length when the first and second receiver coils receive a scattered signal from a formation. Some of these embodiments may be modified using one or more of the following concepts, in any order and in any combination: wherein the first and second sensors maintain said length when the first and second receiver coils receive said direct signal due at least in part to positions of the first and second receiver coils relative to the transmitter; wherein the first and second sensors maintain said length when the first and second receiver coils receive said direct signal due at least in part to numbers of turns in each of the first and second receiver coils; wherein said numbers of turns in each of the first and second receiver coils is different; wherein, due to positions of one or both of the first and second receiver coils relative to the transmitter, to numbers of turns in one or both of the first and second receiver coils, or to both, direct signals provided from the transmitter to the first and second receiver coils do not cause substantial modification of said length; wherein the first and second receiver coils are positioned around a casing; wherein the first and second receiver coils have opposing windings.

At least some embodiments are directed to a system, comprising: a piezoelectric sensor; a fiber optic cable coupled to the piezoelectric sensor; and first and second receiver coils, coupled in series, that apply a voltage to the piezoelectric sensor to adjust a length of the fiber optic cable, wherein the voltage causes a net change in said length only when the first and second receiver coils receive a scattered signal from a formation. Some of these embodiments may be modified using one or more of the following concepts, in any order and in any combination: wherein the voltage does not substantially modify said length when the first and second receiver coils receive only a direct signal from a transmitter; wherein the voltage causes the net change in said length by causing a piezoelectric material within said sensor to enlarge or reduce in size; wherein the first and second receiver coils are positioned relative to a transmitter so that direct signals provided from the transmitter to the first and second receiver coils do not result in substantial modification of said length; wherein each of the first and second receiver coils includes a number of turns such that direct signals provided from a transmitter to the first and second receiver coils do not result in substantial modification of said length; wherein the fiber optic cable includes a coil positioned around a piezoelectric material within the piezoelectric sensor, and wherein said fiber optic cable coil has a number of turns so that direct signals provided from a transmitter to the first and second receiver coils do not result in substantial modification of said length; wherein the system is an inductive system; wherein the first and second receiver coils have opposing windings; wherein the piezoelectric sensor comprises a lead zirconate titanate (PZT) sensor.

At least some embodiments are directed to a method, comprising: providing first and second sensors; coupling first and second receiver coils to the first and second sensors, respectively; coupling the first and second sensors to a fiber optic cable; and positioning the first and second receiver coils relative to a transmitter, adjusting a number of turns in each of said first and second receiver coils, or both, so that said fiber optic cable experiences a net change in length when the first and second receiver coils receive a first type of signal and experiences no substantial modification in length when the first and second receiver coils receive only a second type of signal. Some of these embodiments may be modified using one or more of the following concepts, in any order and in any combination: wherein the first type of signal is a scattered signal from a formation; wherein the second type of signal is a direct signal from a transmitter; further comprising positioning said first and second receiver coils around a single well casing.

The following is claimed:

1. A system, comprising:
   a fiber optic cable;
   first and second sensors to control a length of said cable employing a piezoelectric material; and
   first and second receiver coils that control the first and second sensors, respectively,
   wherein the first and second sensors maintain said length when the first and second receiver coils receive only a direct signal from a transmitter,
   wherein the first and second sensors modify said length when the first and second receiver coils receive a scattered signal from a formation.

2. The system of claim 1, wherein the first and second sensors maintain said length when the first and second receiver coils receive said direct signal due at least in part to positions of the first and second receiver coils relative to the transmitter.

3. The system of claim 1, wherein the first and second sensors maintain said length when the first and second receiver coils receive said direct signal due at least in part to numbers of turns in each of the first and second receiver coils.

4. The system of claim 3, wherein said numbers of turns in each of the first and second receiver coils is different.

5. The system of claim 1, wherein, due to positions of one or both of the first and second receiver coils relative to the transmitter, to numbers of turns in one or both of the first and second receiver coils, or to both, direct signals provided from the transmitter to the first and second receiver coils do not cause substantial modification of said length.

6. The system of claim 1, wherein the first and second receiver coils are positioned around a casing.

7. The system of claim 1, wherein the first and second receiver coils have opposing windings.

8. A system, comprising:
   a piezoelectric sensor;
   a fiber optic cable coupled to the piezoelectric sensor; and
   first and second receiver coils, coupled in series, that apply a voltage to the piezoelectric sensor to adjust a length of the fiber optic cable,
   wherein the voltage causes a net change in said length only when the first and second receiver coils receive a scattered signal from a formation.

9. The system of claim 8, wherein the voltage does not substantially modify said length when the first and second receiver coils receive only a direct signal from a transmitter.

10. The system of claim 8, wherein the voltage causes the net change in said length by causing a piezoelectric material within said sensor to enlarge or reduce in size.

11. The system of claim 8, wherein the first and second receiver coils are positioned relative to a transmitter so that direct signals provided from the transmitter to the first and second receiver coils do not result in substantial modification of said length.

12. The system of claim 8, wherein each of the first and second receiver coils includes a number of turns such that direct signals provided from a transmitter to the first and second receiver coils do not result in substantial modification of said length.

13. The system of claim 8, wherein the fiber optic cable includes a coil positioned around a piezoelectric material within the piezoelectric sensor, and wherein said fiber optic cable coil has a number of turns so that direct signals provided from a transmitter to the first and second receiver coils do not result in substantial modification of said length.

14. The system of claim 8, wherein the system is an inductive system.

15. The system of claim 8, wherein the first and second receiver coils have opposing windings.

16. The system of claim 8, wherein the piezoelectric sensor comprises a lead zirconate titanate (PZT) sensor.

17. A method, comprising:
    providing first and second sensors;
    coupling first and second receiver coils to the first and second sensors, respectively;
    coupling the first and second sensors to a fiber optic cable; and
    positioning the first and second receiver coils relative to a transmitter, adjusting a number of turns in each of said first and second receiver coils, or both, so that, via a piezoelectric material in at least one of said first or second sensors, said fiber optic cable experiences a net change in length when the first and second receiver coils receive a first type of signal and experiences no substantial modification in length when the first and second receiver coils receive only a second type of signal.

18. The method of claim 17, wherein the first type of signal is a scattered signal from a formation.

19. The method of claim 17, wherein the second type of signal is a direct signal from a transmitter.

20. The method of claim 17, further comprising positioning said first and second receiver coils around a single well casing.

\* \* \* \* \*